United States Patent [19]
Miller

[11] Patent Number: 5,312,507
[45] Date of Patent: May 17, 1994

[54] THERMOCONTACT WELDING METHOD AND WELDED PRODUCT

[75] Inventor: William R. Miller, Walnut, Calif.

[73] Assignee: Rembrandt Photo Services, Los Angeles, Calif.

[21] Appl. No.: 120,157

[22] Filed: Sep. 10, 1993

Related U.S. Application Data

[62] Division of Ser. No. 666,260, Mar. 8, 1991, Pat. No. 5,266,150.

[51] Int. Cl.⁵ .................... B32B 31/18; B32B 31/20
[52] U.S. Cl. .................... 156/290; 156/581; 156/583.1; 156/583.4
[58] Field of Search ............ 156/251, 290, 502, 515, 156/580, 581, 583.1, 583.4, 583.6; 100/93 P

[56] References Cited

U.S. PATENT DOCUMENTS

| | | | |
|---|---|---|---|
| 2,596,933 | 5/1952 | Kirk | 219/243 |
| 2,766,365 | 10/1956 | Winstead | 219/243 X |
| 2,767,756 | 10/1956 | Niles | 156/292 X |
| 2,788,041 | 4/1957 | Carver | 156/227 X |
| 2,898,257 | 8/1959 | Carver | 156/289 |
| 3,017,315 | 1/1962 | Doyle | 156/581 |
| 3,033,257 | 5/1962 | Weber | 383/103 |
| 3,078,201 | 2/1963 | Christie | 156/308.4 X |
| 3,246,443 | 4/1966 | Slemmons | 156/583.1 X |
| 3,321,353 | 5/1967 | Zelnick | 156/583.1 X |
| 3,334,004 | 8/1967 | Faust et al. | 156/499 |
| 3,483,060 | 12/1969 | Hu | 156/368 |
| 3,523,050 | 8/1970 | Campbell | 156/289 |
| 3,660,198 | 5/1972 | Thiel | 156/292 |
| 3,729,357 | 4/1973 | Swartz | 156/306.6 |
| 3,730,812 | 5/1973 | Prisk et al. | 156/583.1 X |
| 3,874,976 | 4/1975 | MacFarland, Jr. | 156/515 |
| 4,000,029 | 12/1976 | Michaels | 156/510 |
| 4,043,858 | 8/1977 | Dantowitz | 156/251 |
| 4,175,994 | 11/1979 | Norton et al. | 156/515 X |
| 4,220,493 | 9/1980 | Wehr et al. | 156/379.7 |
| 4,295,908 | 10/1981 | Schaefer et al. | 156/515 X |
| 4,531,997 | 7/1985 | Johnston | 156/498 |
| 4,555,293 | 11/1985 | French | 156/308.4 |
| 4,648,931 | 3/1987 | Johnston | 156/251 |
| 4,692,135 | 9/1987 | Johnson | 493/394 |
| 4,769,106 | 9/1988 | Busching | 156/497 |
| 4,870,800 | 10/1989 | Kasai | 53/88 |

OTHER PUBLICATIONS

"Machines for the Stationery Industry", Brochure, Paul Kiefel GmbH, pp. 19–22 (Apr. 1987).
20th Century Plastics, Jan. 1989 Catalog.
20th Century Plastics, pp. 23–25 of 1985 Catalog.
20th Century Plastics, Jan. 1991 Catalog.
20th Century Plastics, Sample Polypropylene Hanging slide page.

*Primary Examiner*—David A. Simmons
*Assistant Examiner*—J. Sells
*Attorney, Agent, or Firm*—David Weiss

[57] ABSTRACT

An improved thermocontact welding method and apparatus for producing welded seams joining superposed thermoplastic sheets, and in particular for producing solid seams in polypropylene and other polyolefin sheets. The method includes moving a lower platen for engaging an upper die assembly for applying pressure to interposed thermoplastic sheets at areas thereof between the die surface and the platen while the die surface is at a temperature higher than the melting temperature of the sheets and while thermally isolating other areas of the sheets, and the welded sheets are coerced or ejected from the die surface during disengagement of the platen from the die assembly. A preferred product of the method is a polypropylene album leaf having pockets defined by solid weld seams for containing cards or photographs.

20 Claims, 3 Drawing Sheets

THERMOCONTACT WELDING METHOD AND WELDED PRODUCT

CROSS REFERENCE TO RELATED APPLICATION

This application is a division of co-pending U.S. patent application Ser. No. 07/666,260, filed Mar. 8, 1991 now U.S. Pat. No. 5,266,150.

BACKGROUND OF THE INVENTION

This invention relates to methods and apparatus for thermocontact welding of thermoplastic sheets and the product produced thereby, and more particularly to a thermocontact welding method and apparatus for producing welded seams joining polyolefin sheets (such as polypropylene or polyethylene) and the welded product produced thereby.

The invention finds particular application in the fabrication of such articles as album pages or leaves for storing and displaying cards depicting persons of common professional interest, such as sports figures, as well as album pages or leaves for storing and displaying photographs. Such articles are commonly fabricated of sheets of polyvinyl chloride, or vinyl, whereby linear seams are produced for welding such sheets in a configuration for producing pockets for inserting such cards or photographs, usually by radio-frequency welding techniques.

Polypropylene has certain advantages over vinyl as a sheet material for fabricating such articles Polypropylene is substantially chemically inert and will generally not react with dyes and other surface components of sports cards and photographs, and is physically resistant to extreme heat and cold. Polypropylene is highly suitable for archival applications, and polypropylene leaves having pockets for containing cards or photographs are particularly suitable for the long term storage of such contents.

However, unlike vinyl, attempts to weld polypropylene sheets (as well as other polyolefin sheets) by radiofrequency welding techniques have been in general unsatisfactory. Instead, thermocontact welding is generally employed, although attempts to produce a solid weld seam by thermocontact welding have previously caused the welded sheets to exhibit a tendency to curl or otherwise deform, thought to be a result of polypropylene's sensitivity to heat. In order to prevent curling or deformation, prior art thermocontact methods for welding polypropylene sheets have utilized discontinuous or intermittent die surfaces for producing discontinuous or intermittent welded seams—i e. the welded seam is comprised of a sequence or series of welded dots or short dashes with unwelded material between successive dots or dashes. As used herein, the term "solid" as applied to a welded seam is meant to describe a non-intermittent seam, and as applied to a die surface is meant to describe a non-intermittent die surface.

In prior art thermocontact welding, two superposed thermoplastic webs are suspended beneath a downwardly facing upper die which is configured with seam forming die surfaces. Both the upper die and the lower platen having upwardly facing die surfaces are heated, with the temperature of the lower platen and die surfaces being higher than the temperature of the upper die surfaces. When thermocontact welding is utilized for welding polypropylene sheets by means of intermittent welds, the lower platen and die surfaces are conventionally at a temperature higher than the melting point of polypropylene, while the upper die surfaces are conventionally at a temperature lower than the melting point of polypropylene.

SUMMARY OF THE INVENTION

The present invention provides an improved thermocontact welding method and apparatus for forming solid welded seams for joining thermoplastic sheets, particularly thermoplastic sheets which may not be successfully welded by usual commercial methods such as high frequency welding. The method and apparatus find particular application in the welding of polyolefin sheet materials, including polypropylene and polyethylene sheets, wherein attempts to join such sheets with solid seams by prior are thermocontact welding methods and apparatus have resulted in physical deformation of the finished article.

Briefly described, the thermocontact welding method of the present invention comprises the steps of providing a thermocontact welding press having die means including a seam producing heated die surface and thermal isolation means movable relative to the die surface; providing and superposing at least two thermoplastic sheets; engaging the die means and the superposed sheets with the heated die surface engaging areas of the superposed sheets and with the thermal isolation means engaging other areas of the superposed sheets in the vicinity of the die surface; and disengaging the die means and said superposed sheets.

According to one aspect thereof, the thermocontact welding method of the present invention comprises the steps of providing a thermocontact welding press having platen means and opposing die means, the die means including a seam producing die surface and thermal isolation means movable relative to the die surface; interposing superposed thermoplastic sheets between the platen means and the die means; engaging the platen means and the die means for applying pressure to the superposed sheets at areas thereof between the die surface and the platen means and for thermally isolating other areas of the superposed sheets while the die surface is at a temperature higher than the melting temperature of the sheets; and disengaging the platen means and the die means. Preferably, the platen means is at a temperature substantially lower than the melting temperature of the sheets, and the method includes clamping the sheets together at such other areas while thermally isolated during the engaging step, and coercing the sheets from the die surface during the disengaging step.

The apparatus of the present invention comprises, in combination, a thermocontact welding press having platen means and opposing die means, the die means including a seam producing die surface; means for interposing at least two superposed thermoplastic sheets between the platen means and the die means; means for moving the platen means to engage the die means with the superposed sheets therebetween for applying pressure to the interposed sheets at areas thereof between the die surface and the platen means, and to disengage the platen means from the die means; means for heating the die surface to a temperature higher than the melting temperature of the sheets; means for thermally isolating other areas of the interposed sheets in the vicinity of the die surface when the platen means and the die means are engaged; and means for coercing the sheets from the die surface during disengagement of the platen means from the die means. Preferred apparatus includes means for clamping the interposed sheets together at such other areas when the platen means and the die means are engaged. The means for thermally isolating the other areas preferably includes thermal insulation means which additionally provides such clamping.

According to one aspect of the apparatus according to the present invention, a die assembly for a thermocontact welding press is provided which comprises, in combination, support means; die member means secured to the support means and having a downwardly facing die surface; means for heating the die member means; upwardly movable thermal insulation means coupled to the support means and having a downwardly facing flat surface adjacent the die surface and normally slightly lower than the die surface; biasing means for downwardly biasing the thermal insulation means; and stop means for cooperating with the thermal insulation means for precluding upward movement of the flat surface more than a predetermined distance higher than the die surface.

A preferred configuration of the die assembly of the present invention includes a pattern of solid seam producing die surfaces and biased thermal insulation means for producing, by means of the thermocontact welding method of the present invention, a polypropylene album leaf comprising, in combination, a first flat, flexible polypropylene sheet; and at least one second flat, flexible polypropylene sheet superposed on the first sheet and secured to the first sheet by a plurality of solid welded seams to form at least one pocket, such pocket having three closed sides defined by three of the solid seams.

BRIEF DESCRIPTION OF THE DRAWINGS

The novel features which are believed to be characteristic of the invention, together with further advantages thereof, will be better understood from the following description considered in connection with the accompanying drawings in which a preferred embodiment of apparatus according to the invention, the method for practicing the invention, and a product of the method of the invention are illustrated by way of example. It is to be expressly understood, however, that the drawings are for the purpose of illustration and description only and are not intended as a definition of the limits of the invention.

DESCRIPTION OF THE PREFERRED EMBODIMENTS

Figure 1:
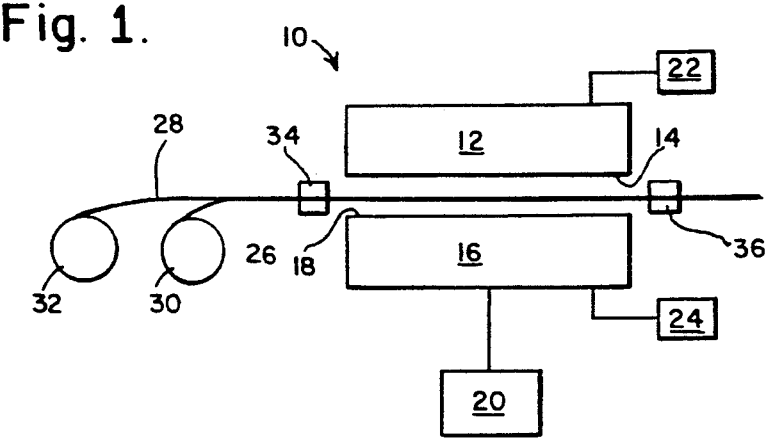
FIG. 1 is a schematic diagram of a conventional thermocontact welding press arrangement.

Turning first to FIG. 1, there is represented a conventional thermocontact welding press apparatus 10, which may be of the type manufactured by Paul Kiefel Hochfrequenc-Anlagen GmbH of Germany, such as its model KSV 600 high speed indexing automated welding unit with thermocontact welding capability.

The thermocontact welding press apparatus 10 includes an upper die assembly 12 having a downwardly facing die surface 14. A lower platen assembly 16 includes an upwardly facing platen 18 which is vertically movable toward and away from the downwardly facing die surface 14 of the die assembly 12, by means of pressure apparatus 20. Heating means 22 is provided for controllably heating the die surface 14 through the die assembly 12, and heating means 24 is provided for controllably heating the platen 18 through the platen assembly 16.

During operation of the thermocontact welding press, at least two polypropylene webs or sheets 26, 28 from respective supply rolls 30, 32 are advanced in superposed relation for being interposed between the platen 18 and the die surface 14. Holding clamps 34, 36 hold the interposed webs or sheets 26, 28 suspended above the platen 18 and beneath the die surface 14 when separated. During the welding operation, the platen 18 is caused to move upwardly for carrying the interposed superposed sheets 26, 28 into welding contact with the die surface 14, after which the platen 18 is caused to move downwardly for permitting release of the welded sheets.

Figure 2:
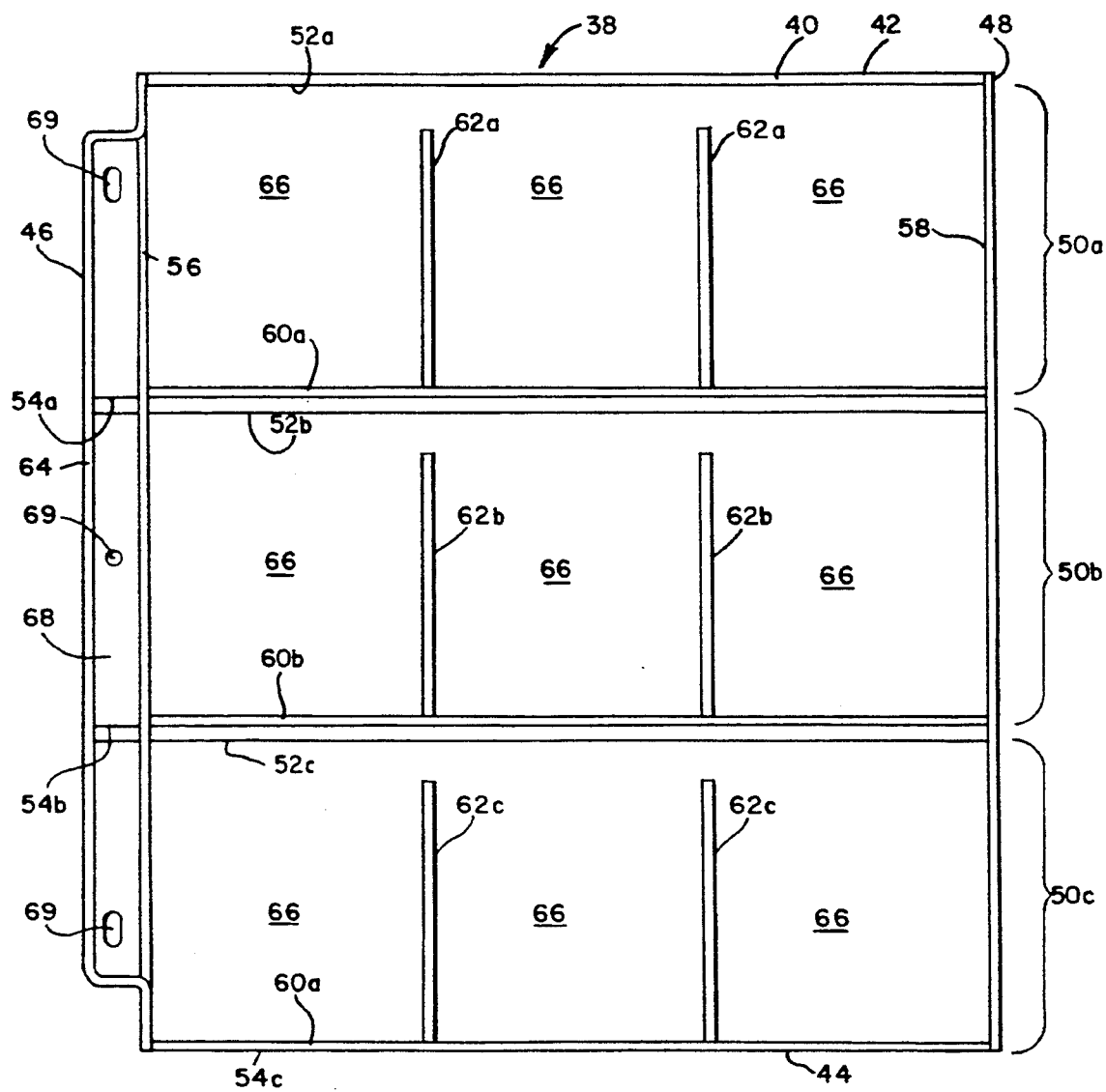
FIG. 2 is a front view of a card album leaf, such as fabricated of polypropylene sheet material, fabricated in accordance with the method of the present invention.

Turning to FIG. 2, a preferred embodiment of a polypropylene album leaf 38 for storing and displaying such items as sports cards or photographs, includes a substantially rectangular, flat, flexible, transparent polypropylene sheet 40 having an upper edge 42 and a lower edge 44 (as viewed in the drawing) and a left edge 46 and a right edge 48 (as viewed in the drawing). Superposed on the sheet 40 are three strips or substantially rectangular, flat, flexible, transparent polypropylene sheets 50a, 50b, 50c, each having a height slightly less than one-third the height of the first sheet 40, and each having a width equal to the width of the sheet 40. The second sheets 50a, 50b, 50c are arranged such that their respective left edges are aligned with the left edge 46 of the first sheet 40 and their respective right edges are aligned with the right edge 48 of the first sheet 40. As viewed in the drawing, the uppermost sheet 50a is superposed on the sheet 40 with the upper edge 52a of sheet 50a parallel to and slightly lower than the upper edge 42 of the sheet 40; the upper edge 52b of the middle sheet 50b is parallel to and slightly lower than the lower edge 54a of the uppermost sheet 50a; and the upper edge 52c of the lowermost sheet 50c is parallel to and slightly lower than the lower edge 54b of the middle sheet 50b, with the lower edge 54c of the lowermost sheet 50c being aligned with the lower edge 44 of the sheet 40.

By the method of the present invention, the second polypropylene sheets 50a, 50b, 50c are each secured to the first polypropylene sheet 40 upon which they are respectively superposed by means of a plurality of solid seams to produce the album page 38 having a plurality of pockets for holding cards or photographs insertable through respective pocket openings provided by the unsealed edges 52a, 52b, 52c. Although other seam patterns are of course possible, the pattern disclosed in the drawing includes, as viewed therein, a left vertical solid seam 56 and a right vertical solid seam 58 extending from the leaf's upper edge 42 to its lower edge 44, horizontal solid seams 60a, 60b, 60c extending between the vertical seams 56, 58 and along the lower edges 54a, 54b, 54c of the sheets 50a, 50b, 50c. A solid seam 64 is preferably provided along the leaf's left edge 46, for providing a tab or margin 68 in which apertures 69 may be cut for permitting the leaf 38 to be retained by correspondingly positioned rings of a loose-leaf binder.

In one example of the album leaf 38, the thickness of each of the polypropylene sheets 40, 50a, 50b, 50c was approximately 130 microns, although flexible sheets having other thicknesses may be employed.

Although polypropylene album leaves of similar general configuration are available in the prior art having intermittent seams—i.e., each seam is comprised of a sequence or series of welded dots or short dashes with unwelded material between successive dots or dashes—the method and apparatus of the present invention permits production of flat (as opposed to curled) polypropylene album leaves with solid or non-intermittent seams. As noted earlier, prior art attempts to produce polypropylene album leaves with solid seams have been unsuccessful, resulting in curled and otherwise deformed products The improved polypropylene album leaf 38 is made possible, and may be mass produced, upon utilization of the thermocontact welding apparatus of FIG. 1 as improved by the apparatus of the present invention and in accordance with the invention's method as described below.

Figure 3:
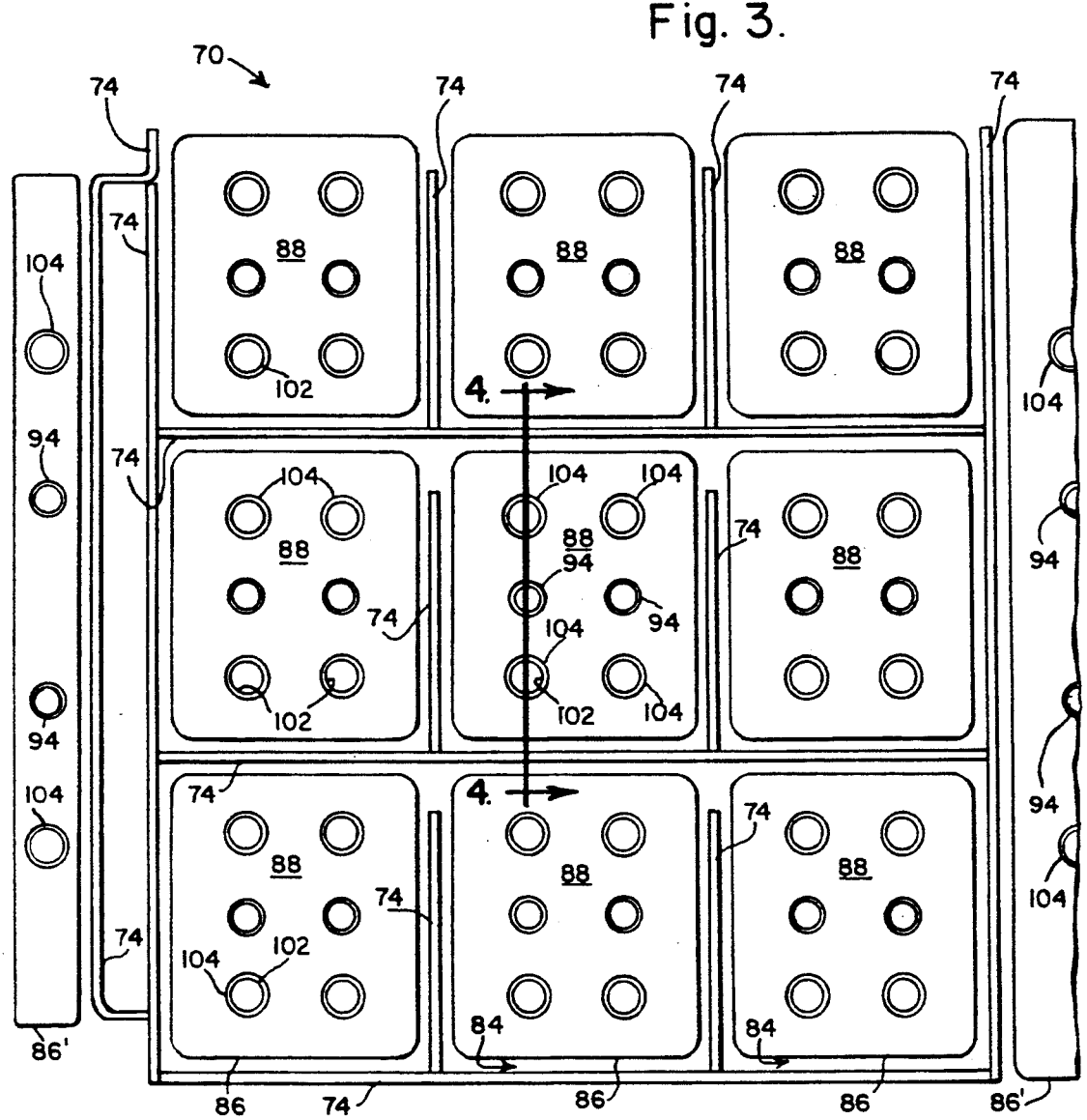
FIG. 3 is a bottom view of a preferred embodiment of a die assembly in accordance with the apparatus of the present invention, having a configuration for fabricating the album leaf of FIG. 2.
Figure 4:
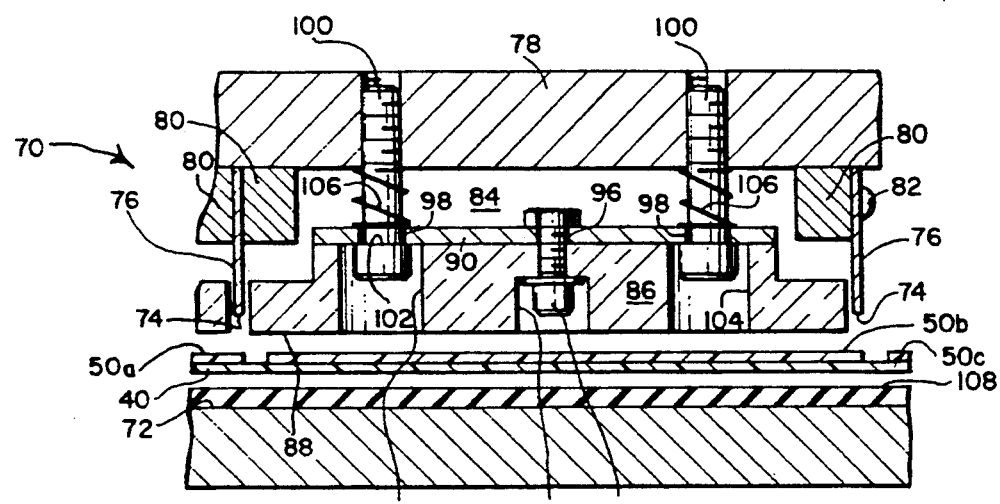
FIG. 4 is a fragmentary cross-sectional elevation view of the die assembly of FIG. 3, taken along the line 4—4 in the direction of the appended arrows, and a lower platen with superposed polypropylene sheets suspended between the upper die assembly and the lower platen when in their normally disengaged position at the beginning of the fabrication method of the present invention.

The upper die assembly 70, for producing the polypropylene album leaf 38 of FIG. 2 in accordance with the thermocontact welding method of the present invention, is represented in FIGS. 3 and 4. FIG. 3 represents substantially one-half of the upper die assembly and produces a single leaf, the remaining substantial one-half of the upper die assembly not being shown but comprises the mirror image of the die assembly shown in FIG. 3 and is employed for simultaneously producing a second leaf 38.

The solid seams sealing the superposed polypropylene sheets of the leaf 38 of FIG. 2, are formed by cooperation between the upper die assembly 70 and the lower platen 72, and specifically as a result of contact engagement between suitably heated non-intermittent or solid die surfaces 74 arranged in a pattern (FIG. 3) corresponding to the desired seam pattern of the album leaf 38 (FIG. 2). The die surfaces 74 are the lowermost portions including the downwardly facing surfaces of thermally conducting bars 76, which are typically constructed of a metal such as brass which has been chrome plated for lubricity. The die members or ba 76 are secured to a thermally conductive stationary die support 78 (which may be constructed of a metal such as aluminum) by means of thermally conductive securing members or blocks 80 (which may also constructed of a metal such as aluminum) secured to the stationary support 78. The securing blocks 80 are situated on both sides of the die member 76, at the left side of FIG. 4; for clarity of illustration, the rightmost securing block is not shown at the right side of the drawing in order to illustrate one means of securing the bars 76 to the securing blocks 78, namely by means of screws 82. The securing blocks 80 may be secured to the support 78 by conventional means such as by screw means (not shown) Controllable heating means (such as the heating means 22 indicated in FIG. 1) are provided for controllably heating the bars 76 and hence the die surfaces 74, such as by heating the stationary die support 78 transmitting heat to the securing blocks 80, in turn transmitting heat to the die bars 76 and hence to the die surfaces 74.

The depending die bars 76 are arranged with their die surfaces 74 in a grid pattern, defining a plurality of generally rectangular cavities 84. Captively suspended in each of these cavities 84, and laterally adjacent to the die surfaces 74, is a refractory insulation member or block 86 having a substantially flat generally rectangular lower or downwardly facing surface 88. Each of the insulation blocks 86 are coupled to the die support 78 such that each block's downwardly facing surface 88 is slightly lower (say one-eighth inch) than the downwardly facing die surfaces 74, and each block 86 is upwardly movable against a downward biasing force. In the example shown in FIGS. 3 and 4, each block 86 is secured to a metal (e.g. aluminum) plate 90 by means of fastening screws 92 within apertures 94 through the block 86 and apertures 96 through the metal plate 90.

The plate 90 contains further apertures 98 through which vertically directed shoulder screws 100 are loosely fitted. The shoulder screws 100 are threadedly secured to the die support 78, and each screw 100 includes an upwardly facing head shoulder 102 engaging the lower surface of the plate 90 (peripherally of the aperture 98) for supporting the plate 90 and hence the block 86 when the block surface 88 is in its downwardmost or normal position as shown in FIG. 4. The insulation blocks 86 are provided with vertical bores 104 within which the shoulder screws 100 are positioned The height of the bores 104 (and accordingly the height of the insulation blocks 86) is greater (say by ¼ inch or more) than the height of the contained screw head plus the maximum upward travel distance of the block surface 88. The insulation block 86 (and hence the block surface 88) is downwardly biased, for example by means of helical springs 106 positioned about the screws 100 and biased against the lower surface of the die support 78 and the upper surface of the plate 90.

Additional insulation blocks 86' are provided as shown in FIG. 3, one being situated laterally adjacent to the die surface 74' for producing the tab seam 64 shown in FIG. 2. Another additional insulation block 86' (one half of which is shown along the right hand side of FIG. 3) is situated laterally adjacent to the farthest right die surface 74 as shown in FIG. 3, and extends into the other half of the upper die assembly not shown in FIG. 3 but which comprises the mirror image of the die assembly shown, as previously discussed. Notwithstanding their different shapes, these additional insulation blocks 86' are secured to the die support 78 in generally the same manner as the blocks 86 and operate in similar manner thereto.

The insulation blocks 86 are preferably constructed of a rigid, high compressive strength, damage resistant, thermally insulating, refractory material such as calcium silicate containing inert fillers and reinforcing agents, an example of which is sold under the trademark Marinite P and manufactured by BNZ Materials, Inc.

The method and operation of the apparatus according to the present invention will be described with respect to FIGS. 4-7, in which the polypropylene album leaf 38 of FIG. 2 is represented as being produced, by way of example. In the manner discussed above with respect to FIG. 1, the upper die assembly 70 of FIG. 4 is maintained stationary above and is initially separate from the vertically movable lower platen 72. A buffer sheet 108 of resilient material, such as silicone rubber of say one-eighth inch thickness, is situated upon the platen 72. The platen 72 is controllably heated (such as by the heating means 24 of FIG. and is maintained at a temperature substantially lower than the melting temperature of the thermoplastic sheets to be welded, while the die bar members 76 and hence the die surfaces 74 are maintained at a temperature higher than the melting temperature of the thermoplastic sheets to be welded In one successful example using polypropylene sheets, the die bars 76 were maintained at 234° Centigrade and the platen 72 was maintained at 40° Centigrade.

Figure 5:
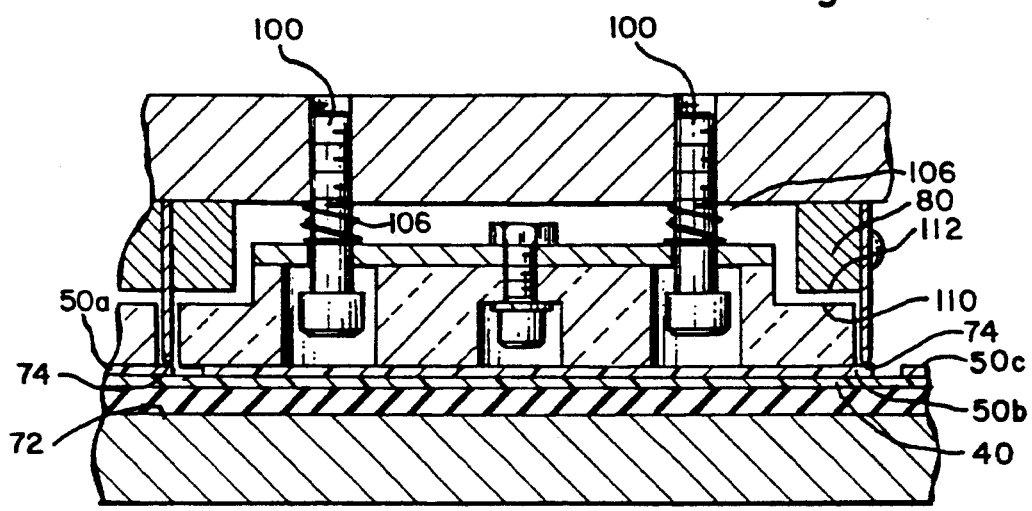
FIG. 5 is a fragmentary cross-sectional elevation view similar to FIG. 4, shown during upward movement of the lower platen.
Figure 6:
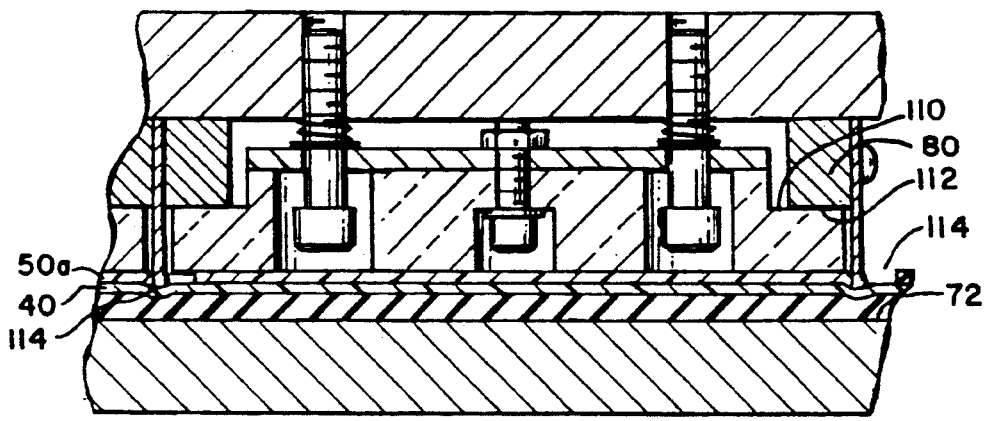
FIG. 6 is a fragmentary cross-sectional elevation view similar to FIG. 4, shown during maximum upward movement of the lower platen.

The superposed polypropylene sheets are interposed between the upper die assembly 70 and the lower platen 72. The polypropylene sheets or strips 50a, 50b, 50c are respectively superposed on the lower polypropylene sheet 40, so as to form the arrangement of pockets on the finished album leaf 38 shown in FIG. 2. In the fragment shown in FIG. 4, the sheets are arranged so that two sheets are in superposed relation directly beneath the seam producing die surfaces 74. The interposed sheets or webs 40, 50a, 50b, 50c are suspended just beneath the upper die assembly 70 by the holding clamps 34, 36 indicated in FIG. 1, the direction of web transport (between thermocontact stamping operations) being perpendicular to the plane of the FIG. 4 drawing During the thermocontact welding operation, the platen 72 (with its buffer sheet 108) is caused to move upwardly (by implementation of the pressure apparatus 20 indicated in FIG. 1), lifting the superposed thermoplastic sheets 40, 50 against the downwardly facing insulation block surface 88 and causing upward movement of the insulation block 86 along the shafts of the screws 100 and further compressing the springs 106; FIG. 5 indicates the condition when the die surfaces 74 contact the upper sheet 50 of the superposed sheets 40, 50. The hot die bars 76 are buried into the thermoplastic sheets as melting occurs with continued pressure applied by the platen 72, as shown in FIG. 6. The depth of penetration of the die surfaces 74 into the melting weld areas 114 and consequently the amount of upward movement of the insulation block 86 are controlled by the amount of pressure applied to the superposed sheets 50, 40 by the platen 72. In order to prevent excessive penetration of the die surfaces 74 into the melt portions 114, excessive upward movement of the insulation block 86 is stopped when an upwardly facing land 110 of the insulation block 86 contacts a downwardly facing surface 112 of a securing block 80. During normal operation, however, the amount of upward movement of the insulation block 86 is controlled by the pressure applied by the platen 72 such that contact between the land 110 and securing block surface 112 does not generally occur and is not usually necessary for controlling the depth of penetration of the die surfaces 74 into the melts 114.

In one successful example, the press pressure driving the platen 72 was approximately 40 psi. It is estimated that the springs 106 produce a downward pressure by each block surface 88 of the order of 10 psi. During upward movement of the platen 72, this biasing pressure assures that air has been removed from between the superposed sheets 40, 50 while the insulating blocks 86 clamp the superposed sheets against the warm platen 72 and thermally isolate the clamped areas of the superposed sheets 40, 50 from the hot die bar members 76 and die surfaces 74 (as well as from the hot support 78 and securing blocks 80, as needed) during the thermocontact welding operation.

Figure 7:
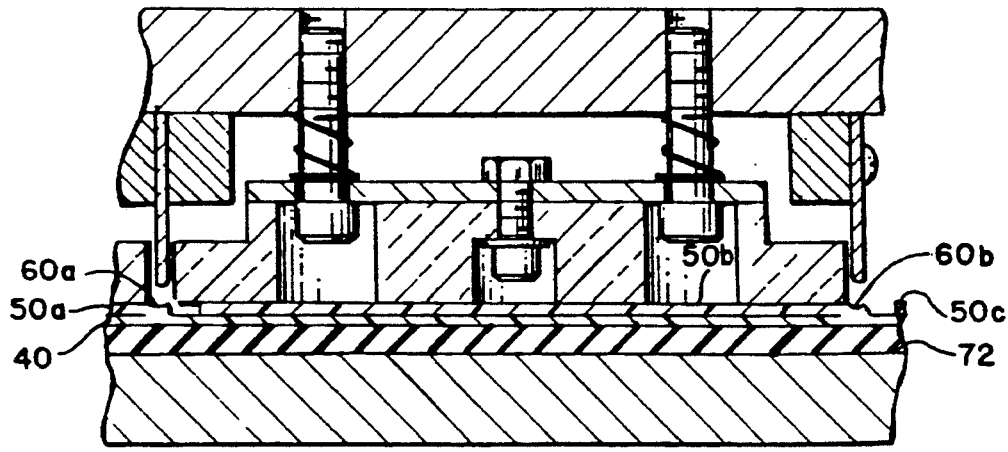
FIG. 7 is a fragmentary cross-sectional elevation view similar to FIG. 4, shown during downward movement of the lower platen.

When upward platen pressure is released and the platen 72 is caused to move downwardly, the biasing force provided by the springs 106 forces downward movement of the insulation block 86, in turn forcing downward movement of the superposed sheets 40, 50 and coercing or ejecting the welded sheets from the die surfaces 74, as shown in FIG. 7. This occurrence precludes the welded sheets 40, 50 from sticking to or being hung up by the hot die bars 76 at the weld areas 114, facilitating rapid removal of the sheets from the hot die surfaces 74 for implementing rapid cooling of the weld areas 114 for their solidification into the welded seams 60a, 60b (FIG. 2).

It may be noted that the air removal function of the insulation blocks 86 may find general analogy to the "push-pads" associated with the radio-frequency welding art, i.e. to the downwardly biased panels (usually Masonite board) positioned in the vicinity of the die electrodes in conventional radio-frequency apparatus for producing weld seams in vinyl sheets. It may be appreciated, however, that the thermal isolation function of the insulation blocks 86 of the present invention does not find analogy in the radio-frequency welding art.

Further downward movement of the platen 72 results in the platen 72 being situated as shown in FIG. 4. The welded product is transported downline (i.e. it is removed from being positioned between the upper die assembly 70 and the lower platen 72) where it is appropriately cut for removing excess material and forming the tab apertures 69 for defining the album leaf 38 shown in FIG. 2.

A release sheet such as a silicone coated paper, although not shown in the drawing, may be situated between the resilient buffer sheet 108 and the thermoplastic sheet 40, in order to assist in release of the welded sheets 40, 50 from the buffer sheet 108 and platen 72.

It should be recognized that the entire thermocontact welding operation occurs very rapidly, engagement between the platen 72 and the upper die assembly 70 during the period when the superposed sheets 40, 50 are in contact with the hot die surfaces 74 being very short, such as of the order of 1.3 milliseconds.

Thus there has been described an improved thermocontact welding method, and apparatus for practicing the improved method, for producing solid seams for welding polypropylene sheets, as well as a card or photo album leaf fabricated by the method utilizing the apparatus of the present invention. Although polypropylene and other polyolefin sheet material have been discussed above as being particularly adaped for the method of the present invention, other thermoplastic materials may be utilized in practicing the invention. Modifications of the apparatus and method disclosed may be developed without departing from the essential characteristics of the present invention. Accordingly, the invention should be limited only by the scope of the claims listed below

I claim:

1. A thermocontact welding method for welding thermoplastic sheets comprising the steps of:

providing a thermocontact welding press having platen means and opposing die means, said die means including a seam producing die surface and thermal isolation means movable relative to said die surface;
interposing superposed thermoplastic sheets between said platen means and said die means;
engaging said platen means and said die means for applying pressure to said superposed sheets at areas thereof between said die surface and said platen means and for thermally isolating other areas of said superposed sheets in the vicinity of said die surface while said die surface is at a temperature higher than the melting temperature of said sheets; and
disengaging said platen means and said die means.

2. The method according to claim 1, wherein said sheets are clamped together at said other areas between said thermal isolation means and said platen means when said platen means and said die means are engaged.

3. The method according to claim 1, wherein during said disengaging step coercing said sheets from said die surface.

4. The method according to claim 1, wherein said platen means is at a temperature lower than the melting temperature of said sheets.

5. The method according to claim 1, wherein said die surface is a solid die surface.

6. A thermocontact welding method for welding thermoplstic sheets, comprising the steps of:
providing a thermocontact welding press having an upwardly facing lower platen and an upper die assembly, said upper die assembly including a downwardly facing seam producing die surface and thermal isolation means movable relative to said die surface;
interposing superposed thermoplastic sheets between said platen and said die assembly;
upwardly moving said platen for engaging said die assembly for applying pressure to said interposed sheets at superposed areas thereof between said die surface and said platen and for engaging said thermal isolation means for clamping said sheets in the vicinity of said die surface while said die surface is at a temperature higher than the melting temperature of said sheets; and
downwardly moving said platen for disengaging said platen from said die assembly while coercing said sheets from said die surface.

7. The method according to claim 6, wherein during said engaging step said platen is at a temperature lower than the melting temperature of said sheets.

8. The method according to claim 6, wherein said die surface is stationary during said engaging step.

9. The method according to claim 6, wherein said die surface is a solid die surface.

10. A thermocontact welding method for welding thermoplastic sheets, comprising the steps of:
providing a thermocontact welding press having a lower platen and an upper die assembly,
said upper die assembly including support means secured to said press and die means secured to said support means and having a downwardly facing die surface, upwardly movable thermal insulating means coupled to said support means and having a downwardly facing flat surface adjacent said die surface and normally slightly lower than said die surface, and biasing means for downwardly biasing said insulating means;
interposing superposed thermoplastic sheets between said platen and said die assembly;
upwardly moving said platen for engaging said die assembly for causing said superposed sheets to be in pressure contact with said die surface and said insulating flat surface while said die surface is at a temperature higher than the melting temperature of said sheets; and
downwardly moving said platen for disengaging said platen from said assembly.

11. The method according to claim 10, wherein during said providing step said die assembly includes stop means for cooperating with said insulating means for precluding upward movement of said insulating surface more than a pre determined distance higher than said die surface.

12. A thermocontact welding method for welding thermoplastic sheets, comprising the steps of:
providing a thermocontact welding press having die means including a seam producing heated die surface and thermal isolation means movable relative to said die surface;
providing and superposing at least two thermoplastic sheets;
engaging said die means and said superposed sheets with said heated die surface engaging areas of said superposed sheets and with said thermal isolation means engaging other areas of said superposed sheets in the vicinity of said die surface; and
disengaging said die means and said superposed sheets.

13. A thermocontact welding method for welding thermoplastic sheets, comprising the steps of:
providing a thermocontact welding press having die means including a seam producing heated die surface and thermal insulation means having a surface laterally adjacent and vertically movable relative to said die surface;
providing and superposing at least two thermoplastic sheets;
engaging said die means and said superposed sheets with said heated die surface engaging areas of said superposed sheets and with said thermal insulation means surface engaging other areas of said superposed sheets; and
disengaging said die means and said superposed sheets.

14. A thermocontact welding method for welding thermoplastic sheets, comprising the steps of:
providing a thermocontact welding press including a die assembly having support means, die member means secured to said support means and having a seam producing die surface, thermal insulation means having a surface laterally adjacent said die surface and normally positioned vertically beyond said die surface and vertically movable toward said support means, and biasing means for biasing said thermal insulation means surface vertically away from said support means and toward its normal position;
providing and superposing at least two thermoplastic sheets
engaging said die assembly and said superposed sheets with said die surface engaging areas of said superposed sheets and said thermal insulation means surface engaging other areas of said superposed sheets in the vicinity of said die surface while said die surface is at a temperature higher than the melting temperature of said sheets; and disengaging said die assembly and said superposed sheets.

15. In a method for manufacturing a plastic album leaf having a plurality of pockets, the steps comprising:

providing a thermocontact welding press including a die having a seam producing heated die surface in a grid pattern defining a plurality of generally rectangular cavities, and further including a plurality of generally rectangular thermal insulation means respectively in said cavities and movable relative to said die surface;

providing a first flexible thermoplastic sheet and at least one second flexible thermoplastic sheet, and superposing said at least one second sheet on said first sheet;

engaging said die and said superposed sheets with said heated die surface engaging areas of said superposed sheets, and engaging said thermal insulation means and other areas of said superposed sheets in the vicinity of said die surface; and disengaging said die and said superposed sheets and disengaging said thermal insulation means and said superposed sheets.

16. The method according to claim 15, wherein said die surface is a solid die surface.

17. In a method for manufacturing a plastic album leaf having a plurality of pockets, the steps comprising:

providing a thermocontact welding press having a lower platen and an upper die assembly, said upper die assembly including a die having a downwardly facing seam producing die surface in a grid pattern defining a plurality of generally rectangular thermal insulation means respectively in said cavities and each said insulation means having a surface normally slightly lower than said die surface, and biasing means for downwardly biasing said insulation means;

providing a first flexible thermoplastic sheet and at least one second flexible thermoplastic sheet, superposing said at least one second sheet on said first sheet, and interposing said superposed sheets between said platen and said die assembly;

engaging said die assembly and said superposed sheets with said die surface engaging areas of said superposed sheets between said die surface and said platen and with said thermal insulation means surfaces engaging other areas of said superposed sheets in the vicinity of said die surface while said die surface is at a temperature higher than the melting temperature of said sheets; and disengaging said die assembly and said superposed sheets.

18. The method according to claim 17, wherein said surface is a sold die surface.

19. The method according to claim 1, 2, 3, 4, 5, 6, 7, 8, 9, 10, 11, 12, 13, 14, 15, 16, 17 or 18, wherein said thermoplastic sheets are of a polyolefin material.

20. The method according to claim 1, 2, 3, 4, 5, 6, 7, 8, 9, 10, 11, 12, 13, 14, 15, 16, 17 or 18, wherein said thermoplastic sheets are polypropylene sheets.

* * * * *